United States Patent
An et al.

(10) Patent No.: US 9,354,385 B2
(45) Date of Patent: May 31, 2016

(54) CURVED DISPLAY APPARATUS

(71) Applicant: SAMSUNG ELECTRONICS CO., LTD., Suwon-si (KR)

(72) Inventors: Jun Seok An, Suwon-si (KR); Chan Hong Park, Anyang-si (KR); Young Chol Lee, Hwaseong-si (KR); Byoung Jin Cho, Anyang-Si (KR); Sung Hwan Kim, Seongnam-si (KR); Jee Su Park, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/060,896

(22) Filed: Oct. 23, 2013

(65) Prior Publication Data

US 2014/0111736 A1    Apr. 24, 2014

(30) Foreign Application Priority Data

Oct. 24, 2012   (KR) .................. 10-2012-0118545

(51) Int. Cl.
*F21V 8/00*        (2006.01)
*G02F 1/1335*      (2006.01)
*G02F 1/1333*      (2006.01)

(52) U.S. Cl.
CPC ........ *G02B 6/0096* (2013.01); *G02F 1/133305* (2013.01); *G02F 1/133615* (2013.01); *G02B 6/0036* (2013.01); *G02B 6/0055* (2013.01)

(58) Field of Classification Search
CPC .................. G02F 1/133305; G02F 1/133615; G02F 1/133603; G02B 6/0096; G02B 6/0055; G02B 6/0036
See application file for complete search history.

(56) References Cited

U.S. PATENT DOCUMENTS

| | | | | |
|---|---|---|---|---|
| 5,664,873 | A | * 9/1997 | Kanda et al. | ................. 362/97.1 |
| 7,229,198 | B2 | * 6/2007 | Sakai | ................... G02B 6/0096 362/225 |
| 8,608,363 | B2 | * 12/2013 | Weber | .................. G02B 6/0055 362/606 |
| 2005/0117197 | A1 | 6/2005 | Ide | |
| 2005/0285133 | A1 | * 12/2005 | Hung | .............................. 257/99 |

(Continued)

FOREIGN PATENT DOCUMENTS

| | | |
|---|---|---|
| JP | 2009-86560 | 4/2009 |
| JP | 2010-181545 | 8/2010 |

(Continued)

OTHER PUBLICATIONS

Extended European Search Report issued Jan. 29, 2014 in European Patent Application No. 13190103.5.

(Continued)

*Primary Examiner* — Dennis Y Kim
(74) *Attorney, Agent, or Firm* — Staas & Halsey LLP

(57) ABSTRACT

A curved display apparatus includes a curved display panel, a curved bottom sash disposed at a rear of the display panel such that the curved bottom sash is spaced apart from the display panel, and a plurality of backlight units disposed at opposite inner sides of the bottom sash to irradiate light to the bottom sash. The inside of the bottom sash reflects the light irradiated from the backlight units to the display panel. Consequently, a light guide plate may be omitted from the display apparatus.

15 Claims, 5 Drawing Sheets

(56) References Cited

U.S. PATENT DOCUMENTS

| | | |
|---|---|---|
| 2007/0014126 A1 | 1/2007 | Kuo et al. |
| 2007/0146569 A1* | 6/2007 | Nouchi et al. ................ 349/58 |
| 2008/0303976 A1* | 12/2008 | Nishizawa et al. ............ 349/64 |
| 2009/0201443 A1* | 8/2009 | Sasaki et al. ................... 349/70 |
| 2010/0142220 A1 | 6/2010 | Lee et al. |
| 2010/0315832 A1* | 12/2010 | Pijlman et al. ............... 362/607 |
| 2011/0051047 A1* | 3/2011 | O'Neill et al. ................ 349/67 |
| 2011/0096262 A1* | 4/2011 | Kikuchi ......................... 349/58 |
| 2012/0057100 A1* | 3/2012 | Masuda et al. ................ 349/62 |

FOREIGN PATENT DOCUMENTS

| | | |
|---|---|---|
| KR | 20-2009-0008749 | 8/2009 |
| WO | 2009/149010 A1 | 12/2009 |

OTHER PUBLICATIONS

European Summons to Attend Oral Proceedings dated Feb. 24, 2016 in European Patent Application No. 13190103.5.

* cited by examiner

CURVED DISPLAY APPARATUS

CROSS-REFERENCE TO RELATED APPLICATIONS

This application claims the priority benefit of Korean Patent Application No. 10-2012-0118545, filed on Oct. 24, 2012 in the Korean Intellectual Property Office, the disclosure of which is incorporated herein by reference.

BACKGROUND

1. Field

The following description relates to a curved display apparatus having curvature toward opposite sides thereof.

2. Description of the Related Art

Generally, a display module is a device including a display panel to display an image. In recent years, a display module using a liquid crystal display panel has been widely used.

A display module includes a display panel, such as a liquid crystal display panel, and a backlight unit disposed at the rear of the display panel.

The backlight unit includes a pair of light emitting diode modules disposed at opposite sides of the rear of the display panel such that the light emitting diode modules face each other to generate light, and a light guide plate disposed at the rear of the display panel between the light emitting diode modules to guide the light irradiated from the light emitting diode modules to the display panel.

SUMMARY

The following description relates to a display apparatus, from which a light guide plate may be omitted.

Additional aspects of the invention will be set forth in part in the description which follows and, in part, will be obvious from the description, or may be learned by practice of the invention.

In accordance with an aspect of the present disclosure, a curved display apparatus includes a curved display panel, a curved bottom sash disposed at a rear of the display panel such that the curved bottom sash is spaced apart from the display panel, and at least one backlight unit disposed on at least one inner side of the bottom sash to irradiate light to the bottom sash, wherein the bottom sash reflects the light irradiated from the backlight unit to the display panel.

The bottom sash may be curved to have curvature varying toward opposite sides thereof.

The bottom sash may be curved such that the opposite sides of the bottom sash are symmetric with respect to a middle of the bottom sash.

The backlight unit may include a vertically extending substrate and a plurality of light emitting diodes arranged at the substrate at intervals in a longitudinal direction of the substrate.

The backlight unit may further include a light guide mounted at each light emitting diode to guide light generated by each light emitting diode such that the light is irradiated to an inside of the bottom sash.

The light guide may include a parabolic reflector having a parabolic reflective surface.

The light guide may include an optical lens.

The curved display apparatus may further include a reflective layer disposed on an inside of the bottom sash to reflect the light irradiated from the backlight unit.

The curved display apparatus may further include a diffusion plate disposed between the display panel and the bottom sash while being spaced apart from the bottom sash.

The diffusion plate may be provided at a rear thereof with a reverse prism type pattern.

The curved display apparatus may further include a diffusion sheet disposed at a front of the diffusion plate to diffuse light having passed through the diffusion plate such that the diffused light is transmitted to the display panel.

The curved display apparatus may further include an auxiliary backlight unit disposed at a middle portion of an inside of the bottom sash.

The bottom sash may be provided at an inside thereof with a diffusion pattern to diffuse light irradiated from the light emitting diodes.

The diffusion pattern may be restrictively formed about portions of the bottom sash perpendicular to the light emitting diodes.

The curved display apparatus may further include a middle mold to maintain a spaced state between the display panel and the bottom sash.

The curved display apparatus may further include a top sash mounted at a front of the middle mold to maintain a connected state between the display panel and the middle mold.

In accordance with an aspect of the present disclosure, a curved display apparatus includes a curved display panel having opposite sides protruding forward, a curved bottom sash having opposite sides protruding forward, the bottom sash being disposed at a rear of the display panel such that the curved bottom sash is spaced apart from the display panel, and a backlight unit disposed on at least one inner side of the bottom sash, wherein the bottom sash is curved to have curvature varying toward opposite sides thereof such that light irradiated from the backlight unit is reflected to the display panel.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
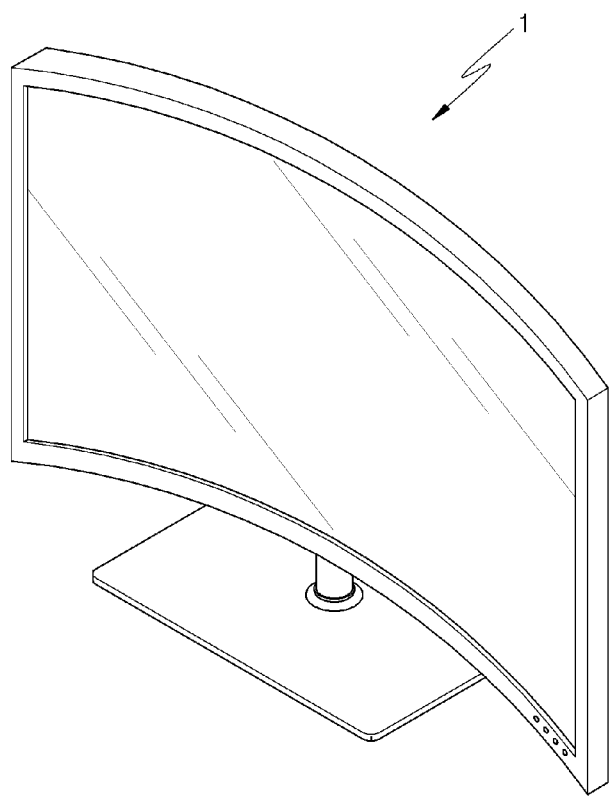
FIG. 1 is a perspective view showing a curved display apparatus according to an embodiment of the present disclosure.

Reference will now be made in detail to the embodiments of the present invention, examples of which are illustrated in the accompanying drawings, wherein like reference numerals refer to like elements throughout.

As shown in FIG. 1, a curved display apparatus 1 according to an embodiment of the present disclosure is curved such that opposite sides of the curved display apparatus protrude farther forward than the middle of the curved display apparatus.

As a result, a 2-dimensional (2D) image on the curved display apparatus 1 may provide a cubic, or 3-dimensional, effect.

Figure 2:
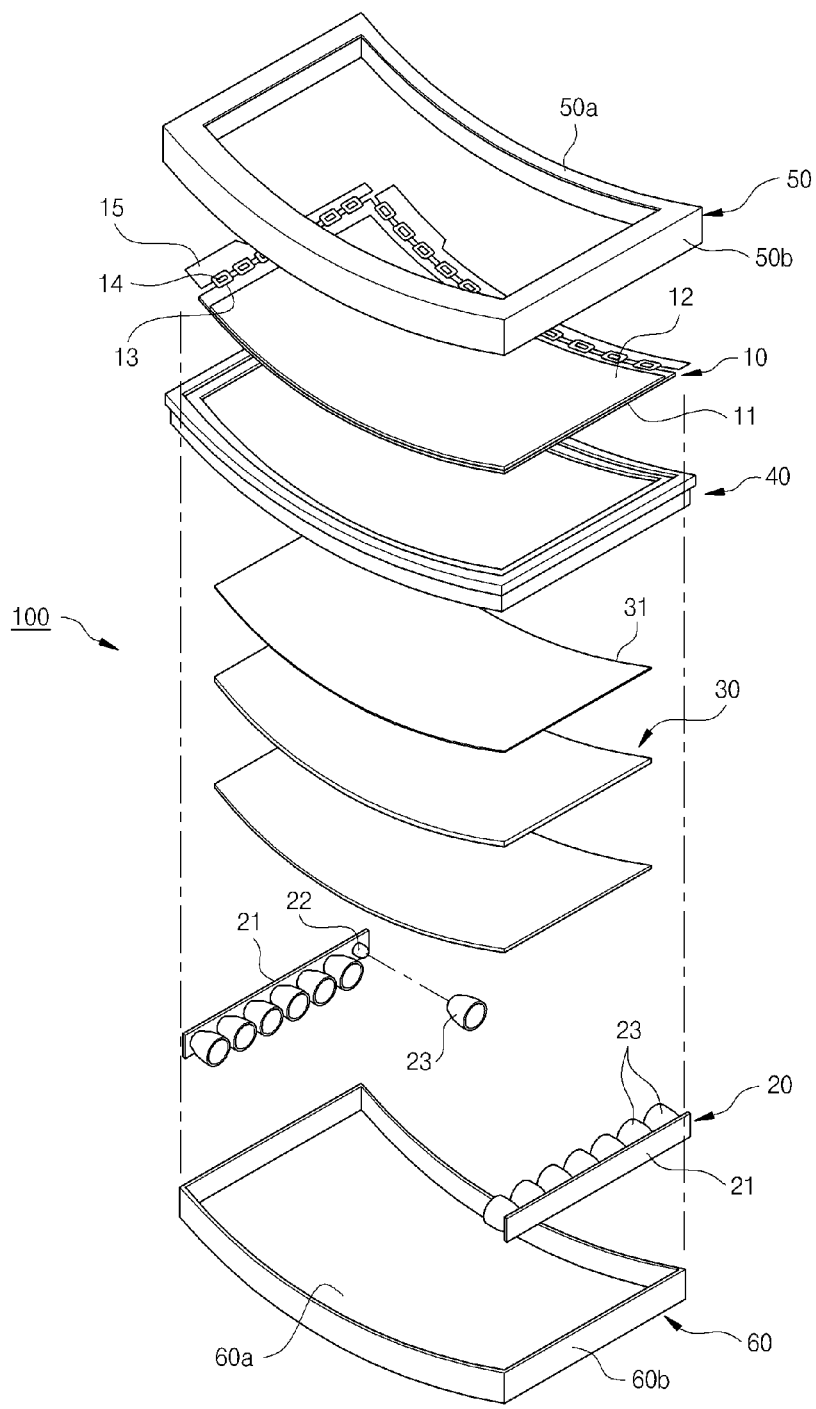
FIG. 2 is an exploded perspective view showing a display module applied to the curved display apparatus according to the embodiment of the present disclosure.
Figure 3:
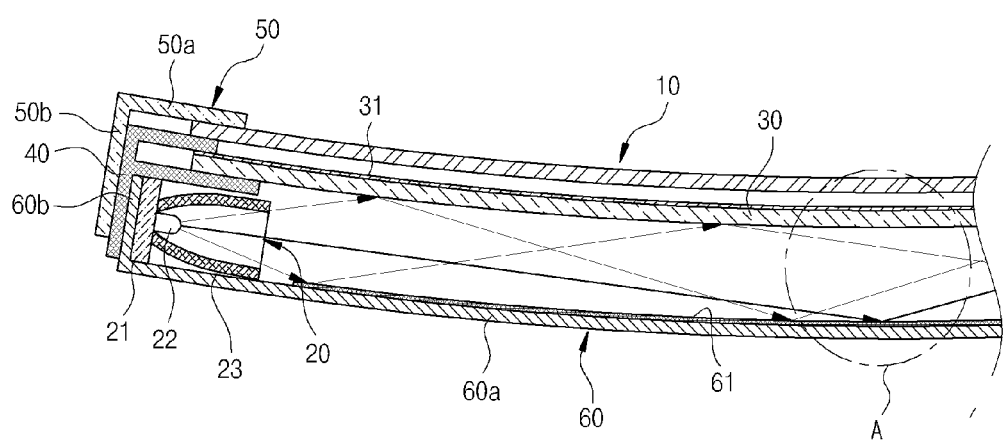
FIG. 3 is a sectional view showing one side of the display module.

As shown in FIGS. 2 and 3, the curved display apparatus 1 includes a display module 100 to display an image.

The display module 100 includes a display panel 10 to display an image, a pair of backlight units 20 disposed at opposite sides of the rear of the display panel 10, a diffusion plate 30 disposed between the display panel 10 and the backlight units 20 to diffuse light generated by the backlight units 20 to the display panel 10, a middle mold 40 to support the display panel 10 and the diffusion plate 30, a top sash 50 coupled to the front side of the middle mold 40 to maintain a connected state between the display panel 10 and the middle mold 40, and a bottom sash 60 coupled to the rear side of the middle mold 40 such that the backlight units 20 are disposed at inner opposite sides of the bottom sash 60.

In this embodiment, the curved display apparatus 1 is curved, and therefore, the display module 100 included in the curved display apparatus 1 is also configured to have curvature from side to side. Consequently, the display panel 10, the diffusion plate 30, the middle mold 40, the top sash 50, and the bottom sash 60 constituting the display module 100 are formed to have curvature from side to side such that opposite sides of each component protrude farther forward than the middle of each component. The respective components may have the same curvature. Alternatively, the respective components may have different curvatures according to design.

The display panel 10 may be a liquid crystal display panel. The display panel 10 includes a thin film transistor substrate 11 having thin film transistors, a color filter substrate 12 opposite to the thin film transistor substrate 11, and a liquid crystal layer (not shown) disposed between the thin film transistor substrate 11 and the color filter substrate 12. In addition, the display panel 10 further includes a flexible printed circuit board 13 provided at one side of the thin film transistor substrate 11, a drive chip 14 mounted to the flexible printed circuit board 13, and a panel circuit board 15 connected to the other side of the flexible printed circuit board 13. In this embodiment, the display panel 10 is configured such that the display panel 10 is curved from the middle to opposite sides thereof while curvature of the display panel 10 varies along the display panel 10. In addition, the display panel 10 is curved such that the opposite sides of the display panel 10 are symmetric with respect to the middle of the display panel 10.

The backlight units 20 are disposed at the inner opposite sides of the bottom sash 60 to emit light to the inner middle portion of the bottom sash 60. Each backlight unit 20 includes a vertically extending substrate 21 to be disposed at a corresponding inner side of the bottom sash 60 and a plurality of light emitting diodes 22 arranged at the substrate 21 at intervals in the longitudinal direction of the substrate 21.

In addition, each backlight unit 20 further includes a light guide 23 mounted at each light emitting diode 22 to guide light generated by each light emitting diode 22 such that the light is irradiated to the bottom sash 60. In this embodiment, each light guide 23 includes a parabolic reflector having a parabolic reflective surface. Consequently, most of the light generated by the light emitting diodes 22 is guided to the inside of the bottom sash 60 through the light guides 23, is reflected by the bottom sash 60, and is thus indirectly transmitted to the display panel 10.

The diffusion plate 30, the display panel 10, and the top sash 50 are sequentially mounted at the front side of the middle mold 30, and the bottom sash 60 is mounted at the rear side of the middle mold 30. The middle mold 30 supports the respective components, and, in addition, maintains a space between the display panel 10 and the bottom sash 60.

The top sash 50 includes a bezel 50a to cover the front edge of the display panel 10 and a top side part 50b bent backward from one end of the bezel 50a to cover the side of the middle mold 40.

The bottom sash 60 includes a rear part 60a forming the rear of the display module 100 and a bottom side part 60b extending forward from the periphery of the rear part 60a to be coupled into the middle mold 40.

The bottom sash 60 is curved such that opposite sides of the bottom sash 60 protrude farther forward than the middle of the bottom sash 60. Correspondingly, the rear part 60a of the bottom sash 60 is also curved such that opposite sides of the rear part 60a protrude farther forward than the middle of the rear part 60a.

Consequently, light generated by the light emitting diodes 22 is reflected by the curved rear part 60a of the bottom sash 60 and is guided to the display panel 10. That is, the rear part 60a of the bottom sash 60 functions to guide light generated by the light emitting diodes 22 to the display panel 10. As a result, it is possible to guide light generated by the light emitting diodes 22 to the display panel 10 through the bottom sash 60, without the provision of a component corresponding to a light guide plate used in a general, or conventional, display apparatus.

The bottom sash 60 is curved to have curvature varying toward opposite sides thereof such that the bottom sash 60 uniformly reflects light throughout the display panel 10. Specifically, the bottom sash 60 is configured such that the bottom sash 60 is curved from the middle to opposite sides thereof while curvature of the bottom sash 60 varies along the bottom sash 60. In addition, the bottom sash 60 is curved such that the opposite sides of the bottom sash 60 are symmetric with respect to the middle of the bottom sash 60.

In this embodiment, a reflective layer 61 is formed on the inner side of the rear part 60a of the bottom sash 60 to more efficiently reflect light. Consequently, light irradiated to the bottom sash 60 may be reflected to the front side, at which the display panel 10 is located, by the reflective layer 61. In an embodiment, the reflective layer 61 is formed by disposing a sheet type member at the inner side of the rear part 60a of the bottom sash 60.

Figure 4:
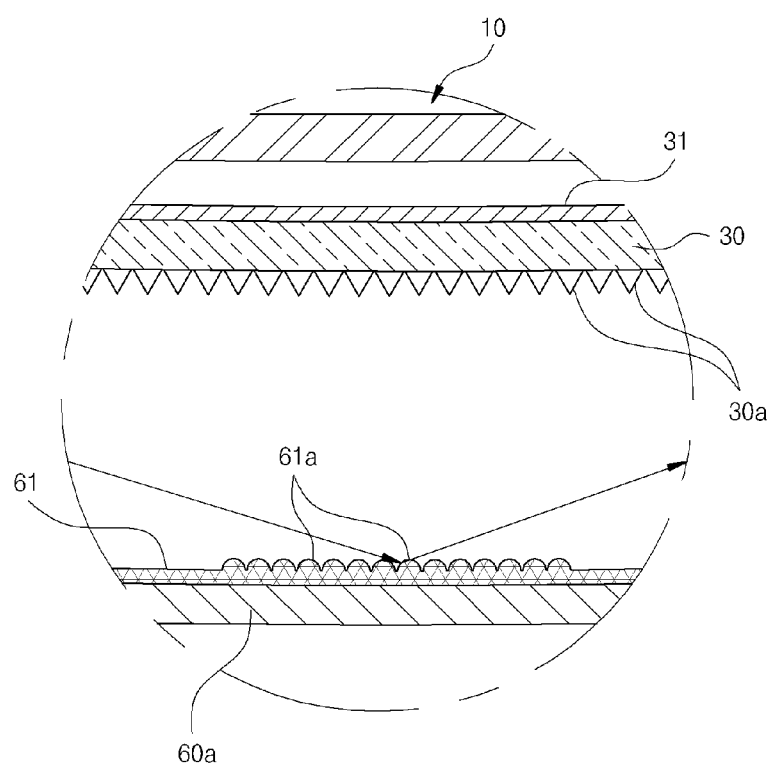
FIG. 4 is an enlarged view showing part A of FIG. 3.

A diffusion pattern 61a (see FIG. 4) to more efficiently diffuse light irradiated to the reflective layer 61 may be formed at the reflective layer 61. In this embodiment, as shown in FIG. 4, the diffusion pattern 61a may be restrictively formed about portions of the reflective layer 61 perpendicular to the light emitting diodes 22. Most of the light generated by the light emitting diodes 22 is irradiated perpendicularly to the light emitting diodes 22. If the light from the above portions of the reflective layer 61 is diffused in the same manner as the light from the remaining portions of the reflective layer 61, therefore, the brightness of the display panel 10 may not be uniform. This phenomenon is prevented by the diffusion pattern 61a.

The diffusion plate 30 is spaced apart from the bottom sash 60. The backlight units 20 are disposed at opposite sides of a space between the diffusion plate 30 and the inside of the bottom sash 60, i.e. the bottom side part 60b. Consequently, light generated by the backlight units 20 is irradiated to the part 60a of the bottom sash 60 through the space between the diffusion plate 30 and the rear part 60a of the bottom sash 60. In this embodiment, a diffusion sheet 31 is disposed at the front of the diffusion plate 30 to further diffuse the light having passed through the diffusion plate 30.

Figure 5:
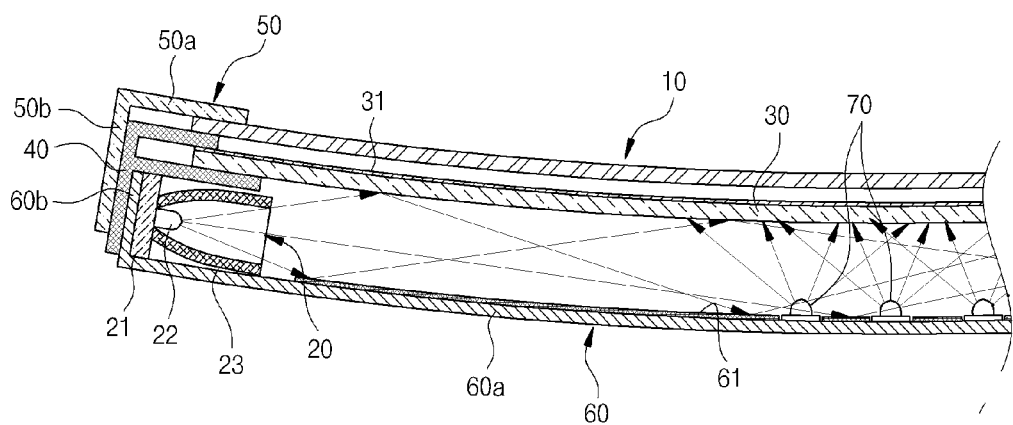
FIG. 5 is a sectional view showing one side of a display module applied to a curved display apparatus according to another embodiment of the present disclosure.

Also, as shown in FIG. 4, a reverse prism type pattern 30a is formed at the rear of the diffusion plate 30. Light incident upon the rear of the diffusion plate 30 at a small incidence angle is irradiated to the display panel 10 through the diffusion plate 30. On the other hand, light incident upon the rear of the diffusion plate 30 at a large incidence angle is reflected toward the inside of the bottom sash 60 by the reverse prism type pattern 30a and is then diffused and reflected by the bottom sash 60. In this embodiment, the backlight units 20 are disposed at the opposite sides of the rear of the display panel 10; however, embodiments of the present disclosure are not limited thereto. In a case in which a sufficient amount of light is not obtained at the middle portion of the display panel 10, as shown in FIG. 5, a plurality of auxiliary backlight units 70 may be disposed at the middle portion of the rear part 60a of the bottom sash 60 to irradiate a sufficient amount of light to the middle portion of the display panel 10.

In this embodiment, the reflective layer 61 is formed at the inside of the rear part 60a of the bottom sash 60; however, embodiments of the present disclosure are not limited thereto. Light may be directly reflected by the inside of the bottom sash 60 without the provision of a component corresponding to the reflective layer 61.

Also, in this embodiment, the diffusion pattern 61a is restrictively formed about portions of the reflective layer 61 perpendicular to the light emitting diodes 22; however, embodiments of the present disclosure are not limited thereto. The diffusion pattern may be formed throughout the reflective layer according to design.

In a case in which the diffusion pattern is formed throughout the reflective layer, the diffusion pattern formed at portions of the reflective layer perpendicular to the light emitting diodes may be larger than that formed at remaining portions of the reflective layer such that diffusion of light at the portions of the reflective layer perpendicular to the light emitting diodes is greater than that at remaining portions of the reflective layer.

Also, the reflective layer may have surface roughness varying depending upon portions thereof without the provision of the diffusion pattern.

Also, in this embodiment, each light guide 23 includes a parabolic reflector; however, embodiments of the present disclosure are not limited thereto. Each light guide may include a transparent optical lens such that light has directivity while passing through each light guide.

Also, in this embodiment, the reflective layer 61 is formed by disposing a sheet type member at the inside of the bottom sash 60; however, embodiments of the present disclosure are not limited thereto. Paint, for example, may be applied to the inside of the bottom sash 60 to form a reflective layer. Alternatively, the inside of the bottom sash may be processed to form a reflective layer.

In this embodiment, each backlight unit 20 includes light emitting diodes 22 and the substrate 21 on which the light emitting diodes 22 are mounted; however, embodiments of the present disclosure are not limited thereto. Various lighting devices, such as a cold cathode fluorescent lamp, for example, to generate light may be used as the backlight units 20.

Also, in this embodiment, the backlight units 20 are disposed at the opposite sides of the rear of the display panel 10; however, embodiments of the present disclosure are not limited thereto. One backlight unit 20 may be disposed only at one side of the rear of the display panel 10 according to design.

As is apparent from the above description, the display apparatus according to the embodiment of the present disclosure is configured such that light generated by the backlight units is reflected by the curved bottom sash and is then guided to the display panel. Consequently, a light guide plate to guide light to the display panel may be omitted from the display apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A curved display apparatus comprising:
a curved display panel;
a curved bottom sash disposed at a rear of the display panel such that the curved bottom sash is spaced apart from the display panel; and
at least one backlight unit, disposed on at least one inner side of the bottom sash and including a vertically extending substrate, a plurality of light emitting diodes arranged at the substrate at intervals in a longitudinal direction of the substrate, and a light guide mounted at each light emitting diode to guide light generated by each light emitting diode, to irradiate the light to an inside of the bottom sash without passing through a light guide plate,
wherein the bottom sash reflects the light irradiated from the backlight unit to the display panel without passing through a light guide plate;
wherein the bottom sash is provided at an inside thereof with a diffusion pattern to diffuse light irradiated from the light emitting diodes; and
wherein the diffusion pattern is restrictively formed about portions of the bottom sash perpendicular to the light emitting diodes.

2. The curved display apparatus according to claim 1, wherein the bottom sash is curved to have a curvature varying toward opposite sides thereof.

3. The curved display apparatus according to claim 2, wherein the bottom sash is curved such that the opposite sides of the bottom sash are symmetric with respect to a middle of the bottom sash.

4. The curved display apparatus according to claim 1, wherein the light guide comprises a parabolic reflector having a parabolic reflective surface.

5. The curved display apparatus according to claim 1, wherein the light guide comprises an optical lens.

6. The curved display apparatus according to claim 1, further comprising a reflective layer disposed on an inside of the bottom sash to reflect the light irradiated from the backlight unit.

7. The curved display apparatus according to claim 1, further comprising a diffusion plate disposed between the display panel and the bottom sash while being spaced apart from the bottom sash.

8. The curved display apparatus according to claim 7, wherein the diffusion plate is provided at a rear thereof with a reverse prism type pattern.

9. The curved display apparatus according to claim 7, further comprising a diffusion sheet disposed at a front of the diffusion plate to diffuse light having passed through the diffusion plate such that the diffused light is transmitted to the display panel.

10. The curved display apparatus according to claim 1, further comprising a middle mold to maintain a spaced state between the display panel and the bottom sash.

11. The curved display apparatus according to claim 10, further comprising a top sash mounted at a front of the middle mold to maintain a connected state between the display panel and the middle mold.

12. A curved display apparatus comprising:
- a curved display panel having opposite sides protruding forward;
- a curved bottom sash having opposite sides protruding forward, the bottom sash being disposed at a rear of the display panel such that the curved bottom sash is spaced apart from the display panel; and
- a backlight unit disposed on at least one inner side of the bottom sash and including a substrate, a plurality of light emitting diodes arranged at the substrate at intervals, and a light guide to guide light irradiated from each light emitting diode to the bottom sash,
- wherein the bottom sash is curved to have a curvature varying toward opposite sides thereof such that light irradiated from the backlight unit is reflected to the display panel without passing through a light guide plate;
- a reflective layer disposed on an inside of the bottom sash to reflect light irradiated from the backlight unit; and
- wherein a diffusion pattern formed at a first portion of the reflective layer perpendicular to the light emitting diodes may be larger than that formed at remaining portions of the reflective layer such that diffusion of light at the first portion of the reflective layer perpendicular to the light emitting diodes is greater than that at remaining portions of the reflective layer.

13. The curved display apparatus according to claim 12, wherein the bottom sash has curvature varying from a middle to the opposite sides thereof, and the curvature of the bottom sash is formed such that the opposite sides of the bottom sash are symmetric with respect to the middle of the bottom sash.

14. The curved display apparatus according to claim 12, wherein the light guide comprises a parabolic reflector having a parabolic reflective surface.

15. The curved display apparatus according to claim 12, wherein the light guide comprises an optical lens.

* * * * *